United States Patent [19]
Lampe

[11] 3,964,966
[45] June 22, 1976

[54] MOLTEN CORE RETENTION ASSEMBLY

[75] Inventor: Robert F. Lampe, Bethel Park, Pa.

[73] Assignee: The United States of America as represented by the United States Energy Research and Development Administration, Washington, D.C.

[22] Filed: Aug. 25, 1975

[21] Appl. No.: 607,852

[52] U.S. Cl. ................................. 176/38; 176/40; 176/87
[51] Int. Cl.² .......................................... G21C 9/00
[58] Field of Search ................... 176/37, 38, 40, 87

[56] References Cited
UNITED STATES PATENTS
3,719,556   3/1973   Snyder et al. ......................... 176/38
3,930,939   1/1976   Bittermann et al. ..................... 76/38

Primary Examiner—Samuel W. Engle
Assistant Examiner—Ralph Palo
Attorney, Agent, or Firm—Dean E. Carlson; Arthur A. Churm; Frank H. Jackson

[57] ABSTRACT

Molten fuel produced in a core overheating accident is caught by a molten core retention assembly consisting of a horizontal baffle plate having a plurality of openings therein, heat exchange tubes having flow holes near the top thereof mounted in the openings, and a cylindrical, imperforate baffle attached to the plate and surrounding the tubes. The baffle assembly is supported from the core support plate of the reactor by a plurality of hanger rods which are welded to radial beams passing under the baffle plate and intermittently welded thereto. Preferably the upper end of the cylindrical baffle terminates in an outwardly facing lip to which are welded a plurality of bearings having slots therein adapted to accept the hanger rods.

4 Claims, 3 Drawing Figures

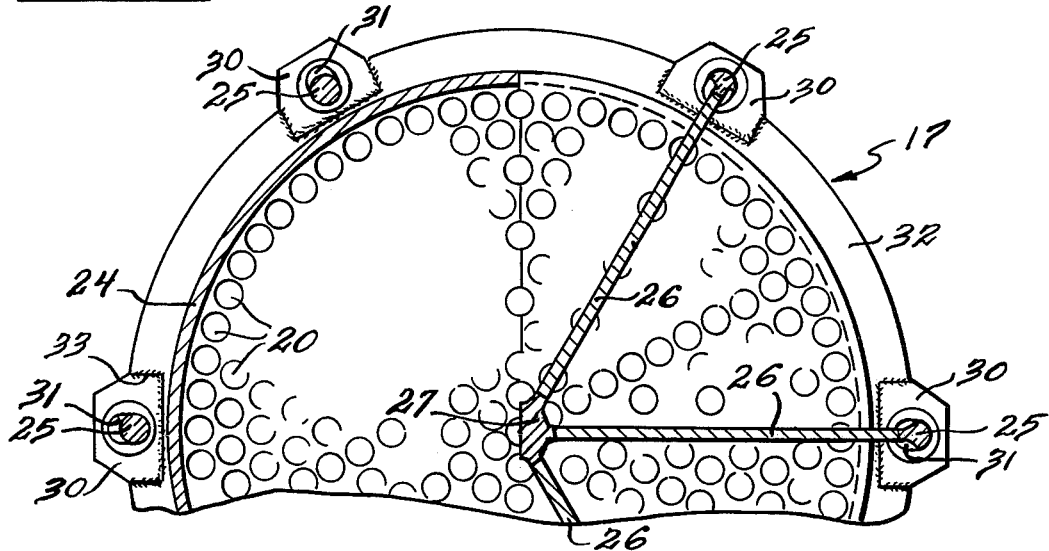
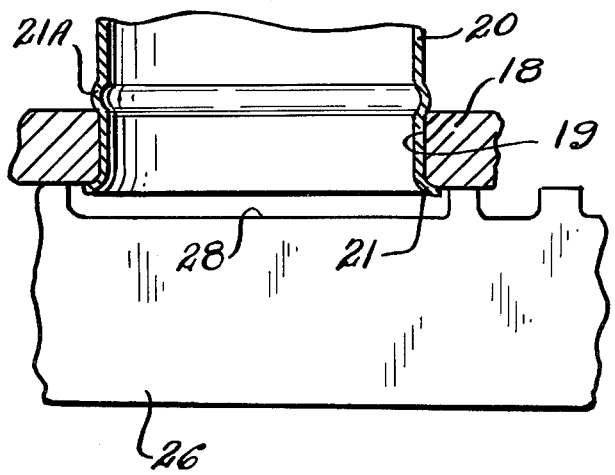

“3,964,966”

MOLTEN CORE RETENTION ASSEMBLY

CONTRACTUAL ORIGIN OF THE INVENTION

The invention described herein was made in the course of, or under, a contract with the U.S. Energy Research and Development Administration.

BACKGROUND OF THE INVENTION

This invention relates to a molten core retention system for a liquid-metal-cooled fast breeder reactor. In more detail, the invention relates to an in-vessel safeguard baffle assembly designed to prevent molten fuel from melting through the containment vessel for the reactor. Such a retention system is frequently called a "core catcher" in the literature and for brevity this name will be employed hereinafter.

It is postulated that under certain conditions an accident could occur to a fast breeder reactor which could cause all or part of the fuel to melt. One example of a sequence of events that could lead to a release of radioactive material can be hypothesized as follows:

a. Objects used during plant construction are forgotten and left in the piping system.
b. Sodium flow during plant operation causes the objects to move downstream to the core inlet region.
c. One section of the core is starved of coolant flow because of the blockage by foreign objects.
d. Fuel pins melt in the region of starved flow.
e. Molten material flows downward by gravity from the core region and collects on the reactor vessel bottom.
f. The reactor vessel bottom melts as a result of the heat generated by the debris collected thereon.
g. Sodium and radioactive debris flow from the reactor vessel into the guard vessel by gravity.
h. The guard vessel bottom melts as a result of the heat generated by the radioactive debris collected thereon.
i. Sodium and radioactive debris flow through the melted hole in the guard vessel to contaminate the biosphere.

Clearly such a sequence of events — or any other sequence of events leading to contamination of the biosphere with radioactivity, even though the probability of occurrence is very low — cannot be tolerated. Various design approaches have been proposed to solve this potential problem.

These include:
1. In-reactor vessel core catchers.
2. In-reactor tank core catchers.
3. Sodium-cooled trays in the reactor cavity.
4. A cooled reactor cavity liner.
5. A sacrificial bed within or outside of the reactor vessel.

A number of different attempts have been made to solve the problem with an in-vessel core catcher but these attempts were deterred from finding a practical solution by the inability to satisfy one or more of the following requirements:

a. Space for containment of substantial quantities of radioactive debris material (possibly greater than 50% of the core) must be provided.
b. Criticality of the contained debris must be prevented.
c. The heat generated by the debris must be dissipated without overheating the containment structure.
d. The debris material must be adequately cooled by natural means — such as natural circulation of sodium.
e. The containment structure must not introduce unacceptable resistance to sodium flow.
f. The containment structure must withstand normal operating loads, anticipated transients and unlikely plant failure events without damage, for extended periods of operation.
g. Manufacturing must be performed using conventional techniques.

SUMMARY OF THE INVENTION

Damage to the reactor vessel bottom from radioactive debris from an overheated core is prevented by a molten core retention system suspended from the core support plate and consisting of a horizontal baffle plate, a plurality of heat exchange tubes penetrating the plate and having openings in the top, and a cylindrical baffle surrounding the tubes and attached to the plate. The retention system is supported from the core support plate by hanger rods welded to the radial beam which are intermittently welded to the undersurfaces of the horizontal baffle plate. Preferably the upper end of the cylindrical baffle terminates in a lip having slots therein through which the hanger rods extend, permitting a small amount of radial movement of the retention system.

BRIEF DESCRIPTION OF THE DRAWINGS

FIG. 2 is a horizontal section looking up in the direction of the arrows 2—2, and FIG. 3 is a detail view of that portion of the system enclosed by the line labelled 3 in FIG. 1.

DESCRIPTION OF THE INVENTION

Figure 1:
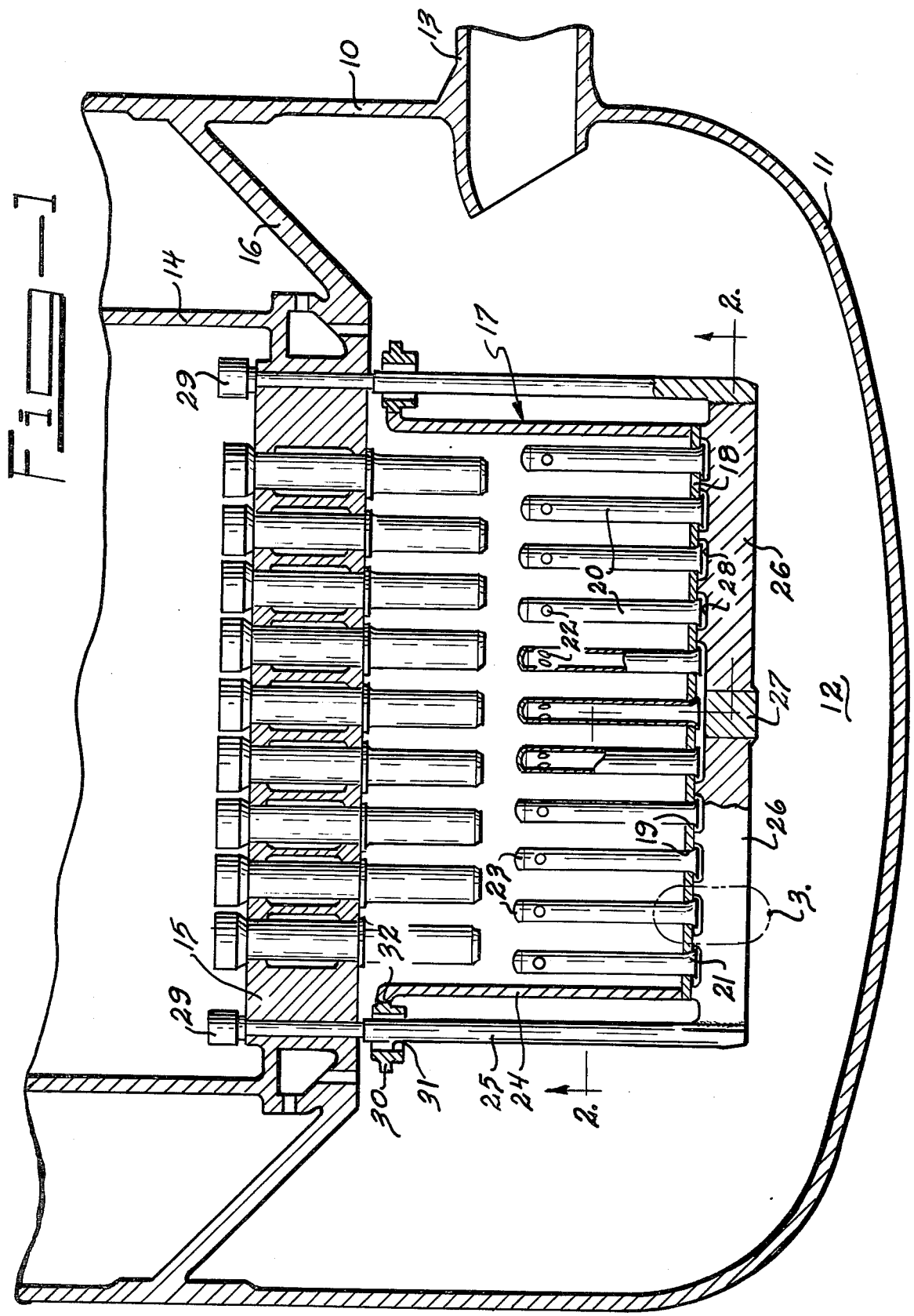
FIG. 1 is a vertical cross section of the lower portion of a nuclear reactor incorporating the molten core retention system of the present invention.

The accompanying drawing shows only so much of a liquid-metalcooled fast breeder reactor as is necessary to illustrate the setting of the present invention, the complete reactor being disclosed in U.S. Patent application Ser. No. 503,149, filed Sept. 4, 1974. The reactor includes a generally cylindrical pressure vessel 10 closed at the bottom by a bell 11 which bounds an inlet plenum 12. The vessel 10 has a plurality of inlet nozzles 13 above the bell 11 through which a heat-exchange fluid such as liquid sodium is supplied to the plenum 12 under pressure. The reactor core (not shown) is surrounded by a core barrel 14 and rests on support plate 15 which is supported from vessel 10 by conical skirt 16. A core catcher 17 according to the present invention of diameter greater than the reactor core is disposed in the pressure vessel 10 within inlet plenum 12 below the reactor core.

Core catcher 17 includes a horizontal, circular baffle plate 18 having a plurality of openings 19 distributed in concentric circles about a central opening. Vertical heat transfer tubes 20 (4-inch, Type 304 stainless steel, schedule 5 pipe) are mounted in each of said openings by roll forming and welding. It will be noted that the flared end 21 of the tubes extends a short distance below the bottom of the baffle plate and that roll 21A is above the top of the baffle plate. The double attachment gives added assurance that a tube will never break loose during operation. Heat transfer tubes 20 are each drilled with three 2-inch diameter flow holes 22 near the end thereof and butt welded to an end cap 23 to close off the end. Baffle plate 18 is welded at its periphery to an imperforate, cylindrical baffle 24 to provide edge support for the plate.

Core catcher 17 is supported from core support plate 15 by six uniformly spaced hanger rods 25, the lower end of each of which is welded to one of six radial beams 26 joined at the center by full-penetration welding to a hub 27. Radial beams 26 are intermittently welded to the bottom surface of baffle plate 18, channels 28 in the top of the beams accommodating the flared ends 21 of the vertical tubes. The end of radial beams 26 and the hub 27 are also depressed sufficiently to accommodate the flared end 21 of a central heat transfer tube 20. Radial beams 26 provide support for baffle plate 18 in bending.

Hanger rods 25 are attached to core support plate 15 by means of retainers 29 such that up and down loads can be transmitted. Hanger rods 25 also provide lateral support for the core catcher by transmitting lateral loads by shear into the core support plate. Radial motions that may develop in the core catcher during transient phases of operation are allowed to occur by bearings 30 having slots 31 therein which are welded to outwardly extending lip 32 on cylindrical baffle 24 within notches 33 therein. By allowing the relative motion to occur between the core catcher and the hanger rod, thermal stresses are minimized.

Important features of this invention follow:
 a. Containment volume can handle a complete core, even if the debris falls by a single stream through the core support plate.
 b. Adequate cooling of the heat-generating debris provided by natural insulation with no forced flow required.
 c. No device external to the reactor vessel is required.
 d. No attachments or modifications to the reactor vessel are required.
 e. Fabrication can be accomplished using conventional techniques.
 f. The core catcher provides for the accommodation of thermal expansion during transients.
 g. Criticality of debris is prevented by spatial separation.
 h. A screening effect is provided by the baffle assembly to eliminate possible flow blockage near the core inlet.

In the extremely remote chance that an accident occurs which causes all or a part of the fuel to become molten, the fuel will cascade down through the core support plate and onto the core catcher between the heat-exchange tubes of the present invention wherein sodium continuing to flow through heat-exchange tubes by natural convection will cool the molten fuel and the heat-exchange tubes interspersed in the mass of molten fuel will eliminate any possibility that the fuel can attain a critical mass.

The embodiments of the invention in which an exclusive property or privilege is claimed are defined as follows:

1. In a liquid-metal-cooled fast breeder reactor including a core disposed within a pressure vessel and supported therein by a core support plate, the improvement comprising a molten core retention assembly disposed below the core comprising a horizontal, circular baffle plate of diameter greater than that of the reactor core having a plurality of openings therein, vertical heat-transfer tubes mounted in said openings and extending upwardly therefrom, and having flow holes near the upper end thereof, an imperforate, cylindrical baffle welded to the periphery of the baffle plate and extending upwardly therefrom, a plurality of radial beams intermittently welded to the under surface of said baffle plates and joined at the center by a hub, and a plurality of hanger rods adapted to be supported from the core support plate of the reactor, each of which has its lower end welded to the end of one of the radial beams, wherein said retention assembly is disposed within the pressure vessel of the reactor below the reactor core.

2. An assembly according to claim 1 wherein said heat transfer tubes have a flared end extending a short distance below the bottom of the baffle plate and the radial beams have channels in the top thereof accommodating the flared ends of the heat-transfer tubes.

3. An assembly according to claim 2 wherein said cylindrical baffle has an outwardly extending lip thereon and including a plurality of bearings each having a slot therein welded to said lip, each of said slots receiving a hanger rod.

4. In a liquid-metal-cooled fast breeder reactor including a core disposed within a pressure vessel and supported therein by a core support plate, the improvement comprising a molten core retention assembly disposed below the core and consisting of a horizontal, circular baffle plate of diameter greater than that of the core having a plurality of openings therein arranged in concentric rings about a central opening, vertical heat-transfer tubes mounted in said openings and extending upwardly therefrom with a flared end extending just below the bottom of the baffle plate and a roll just above the baffle plate, said heat-transfer tubes having flow holes near the upper end thereof, an end cap closing the end of said heat-transfer tubes, an imperforate, cylindrical baffle welded to the periphery of the baffle plate and extending upwardly therefrom, a plurality of radial beams intermittently welded to the under surface of the baffle plate and joined at the center by a hub, said radial beams having channels in the top thereof accommodating the flared ends of the heat-transfer tubes, a plurality of hanger rods supported from the core support plate by retainers such that up and down loads can be transmitted, the lower end of each hanger rod being welded to the end of a radial beam, said cylindrical baffle having an outwardly extending lip thereon, and a plurality of bearings each having a slot therein welded within notches in said lip, each of the slots receiving a hanger rod.

* * * * *